United States Patent
Takase et al.

(10) Patent No.: US 8,290,107 B2
(45) Date of Patent: Oct. 16, 2012

(54) CLOCK DATA RECOVERY CIRCUIT

(75) Inventors: Masayuki Takase, Fujisawa (JP); Hideki Endo, Kokubunji (JP); Koji Fukuda, Fuchu (JP); Kenichi Sakamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 927 days.

(21) Appl. No.: 12/320,472

(22) Filed: Jan. 27, 2009

(65) Prior Publication Data

US 2009/0232265 A1 Sep. 17, 2009

(30) Foreign Application Priority Data

Mar. 13, 2008 (JP) ................................. 2008-063519

(51) Int. Cl.
*H04L 7/00* (2006.01)
*H04L 25/00* (2006.01)
*H04L 25/40* (2006.01)
(52) U.S. Cl. ........ 375/371; 375/373; 375/375; 375/376; 327/147; 327/156; 327/162; 327/163
(58) Field of Classification Search .......... 375/371–376; 327/147–163
See application file for complete search history.

(56) References Cited

U.S. PATENT DOCUMENTS

2004/0114632 A1* 6/2004 Yuuki et al. ................... 370/503

FOREIGN PATENT DOCUMENTS

JP 02-056134 8/1988

* cited by examiner

*Primary Examiner* — Curtis Odom
(74) *Attorney, Agent, or Firm* — Crowell & Moring LLP

(57) ABSTRACT

A clock data recovery circuit that supplies stable reference clocks to the object respectively by shortening the time of bit synchronization with each received burst data signal regardless of jittering components included in the received burst data signal, includes an interpolator that generates a reference clock having the same frequency as that of a received burst data signal and two types of determination clocks having a phase that is different from that of the reference clock respectively; and a phase adjustment control circuit that can change the phase of the reference clock in units of M/2π. After beginning receiving of a burst data signal, the clock data recovery circuit sets a large phase change value at the first phase adjustment timing and reduces the change value in the second and subsequent phase adjustment timings, thereby realizing quick bit synchronization with the received burst data signal to generate a reference clock.

6 Claims, 13 Drawing Sheets

FIG. 12
| ONU ID (101) | EARLY DETERMINATION PHASE $\phi_{-1}$ (102) | LATE DETERMINATION PHASE $\phi_{+1}$ (103) |
|---|---|---|
| 0 | -9 | +9 |
| 1 | -6 | +7 |
| (n) | (n) | (n) |
FIG. 13
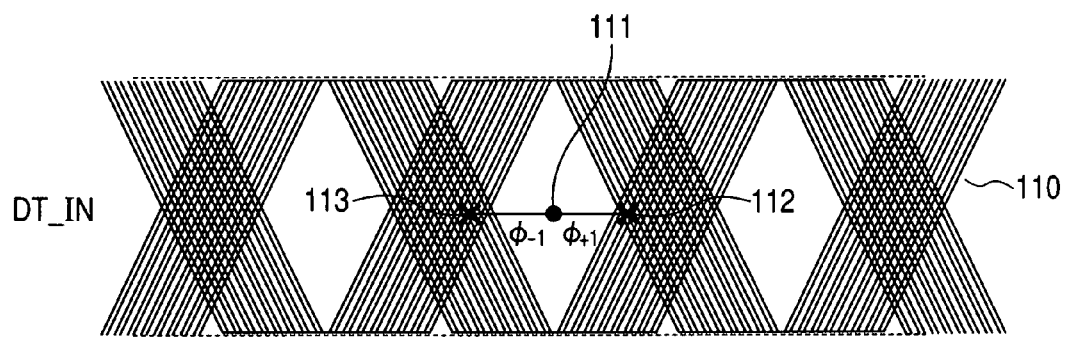
FIG. 14
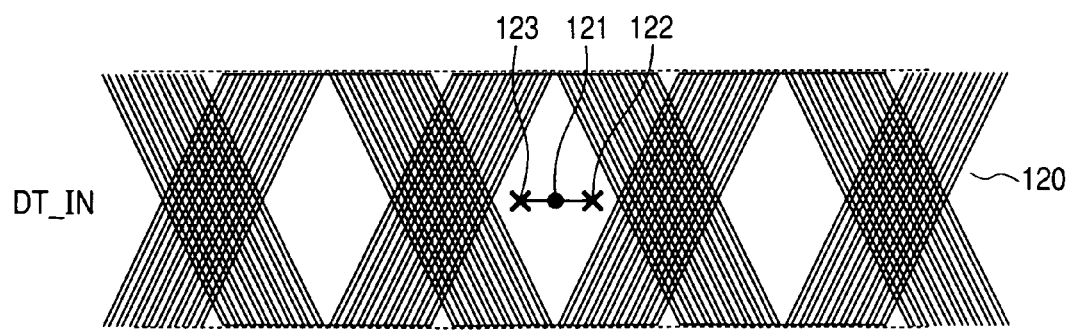

CLOCK DATA RECOVERY CIRCUIT

CLAIM OF PRIORITY

The present application claims priority from Japanese patent application JP 2008-063519 filed on Mar. 13, 2008, the content of which is hereby incorporated by reference into this application.

FIELD OF THE INVENTION

The present invention relates to a clock and data recovery (CDR) circuit that reproduces clock signals from received data signals respectively. The present invention, when employed for such a communication system as a PON (Passive Optical Network) system capable of receiving data signals as burst signals, can shorten the bit synchronization time between burst data receiving and phase-matched clock signal sending.

BACKGROUND OF THE INVENTION

There is a clock data recovery circuit that recovers clock signals from burst data signals. Such a data and clock receiver circuit is disclosed in JP-A-Hei2(1990)-56134.

According to the clock data recovery circuit disclosed by JP-A-Hei2(1990)-56134, a binary quantization comparator is used to check received burst signals and sampling clocks to determine whether their phases are early or late respectively. If the number of any of "early" and "late" determinations reaches a preset threshold value N, the comparator moves the sampling clock phase by a ±M value. And in order to shorten the bit synchronization time between burst data signals and sampling clocks, if the number of any of "early" and "late" determinations reaches the preset threshold value N upon starting burst signal receiving, the comparator moves the sampling clock phase by an M value (quick mode) and if the number of any of "early" and "late" determinations reaches the preset threshold value N after determining that the synchronization with burst data signals is established, the comparator moves the sampling clock phase by an M' value (continuous mode). The relationship between M and M' is assumed as M>M'. And if detecting a phase difference upon starting burst data receiving, the comparator adjusts the phases significantly to realize quick bit synchronization.

SUMMARY OF THE INVENTION

According to the method disclosed in JP-A-Hei2(1990)-56134, consideration is taken to the mode switching between quick mode and continuous mode upon receiving each burst data signal, thereby realizing the quick bit synchronization. In case of the above method, phases are kept moved by M in the quick mode to quicken the bit synchronization. And the method, when increasing the M value, might disable fine phase adjustment, thereby disturbing the establishment of bit synchronization. On the other hand, when decreasing the M value, the method might slow down the quick mode operation up to almost the same level as that of the continuous mode. And this might also cause the bit synchronization time to be extended if there is a large phase difference between a burst data signal and a sampling clock. This has been a problem.

Furthermore, in case of a PON system used for the connection between user sites and communication provider sites through a multi-branch optical fiber respectively, noise components differ among optical access sections according to the distance between each user site and each communication provider site, thereby the eye size comes to differ among burst data signals. If a burst data signal of which eye size is the maximum is used as a reference to design a clock data recovery circuit, bit synchronization with burst data signals of which eye sizes are small is disabled. This has also been a problem. And if a burst data signal of which eye size is the minimum is used as a reference to design a clock data recovery circuit, bit synchronization with burst data signals of which eye sizes are small is enabled, but the bit synchronization is often not established when jittering is detected in the signals. This has also been another problem.

Under such circumstances, it is an object of the present invention to provide a clock data recovery circuit capable of realizing quick bit synchronization with burst data signals fixedly in time even upon receiving burst data signals having different eye sizes respectively and assuring such quick bit synchronization even when jittering occurs, thereby the circuit is employable suitably for PON systems.

The clock data recovery circuit of the present invention includes a data sampling block that samples burst data signals with reproduction clocks having the same frequency as that of the burst data signals respectively; a reference clock generation block that generates the reproduction clocks at a fixed phase difference; a phase comparator that determines a phase difference between each burst data signal and each reproduction clock according to a result of sampling by the data sampling block; and a phase adjustment control circuit that collects the result of the comparison from the phase comparator and notifies the reference clock generation block of how much the reproduction clock phase is moved in each fixed phase determination period.

The phase adjustment control circuit, upon detecting a phase difference between a burst data signal and a first reproduction clock in the first phase determination period after beginning receiving of burst data signals, instructs the reference clock generation block to generate a reference clock of which phase is moved by N times of the fixed phase difference from the initial phase. And in the next and subsequent phase determination periods, the phase adjustment control circuit instructs the reference clock generation block to generate a reference clock of which phase is further moved by a distance that is under the preceding movement distance and over the fixed phase difference. After the phase movement distance matches with the fixed phase difference, the phase adjustment control circuit, upon detecting a phase difference between a burst data signal and a reproduction clock, instructs the reference clock generation block to generate a reference clock of which phase is moved by the distance of a fixed phase difference.

Here, the fixed phase difference means a phase obtained by dividing one cycle of the clock phase $2\pi$ by a given integer M and it is represented as $2\pi/M$.

Preferably, the N value should be an integer obtained by rounding up the decimal places of a value found with $(M/2^{2+t})$. The $(M/2^{2+t})$ uses two parameters that are an integer M obtained by dividing the phase $2\pi$ by the fixed phase distance and the number of phase comparisons t (t=0, 1, 2, ...) after receiving the object burst data. Furthermore, preferably, each of the second and subsequent phase adjustment values should take an integer obtained by rounding up the decimal places of a value found with ½ of the N value.

Preferably, the data sampling block should sample the burst data signal using the reference clock, the early sampling clock, and the late sampling clock.

Also preferably, the phase comparator should determine whether the burst data signal is earlier or later than the reference clock according to the result of the sampling by the data sampling block and notifies the result to the phase adjustment control circuit.

Also preferably, the phase adjustment control circuit should include a sampling clock phase difference table and refers to the table according to a burst identifier used to identify a burst data signal and given before receiving the object burst data signal, then notifies the value obtained from the table to the reference clock generation block.

The reference clock generation block, upon obtaining a sampling clock phase difference, determines a phase difference between the reference clock and the early sampling clock as the obtained value and the phase difference between the reference clock and the late sampling clock as the obtained value.

The present invention can, therefore, assure quick bit synchronization with burst data signals fixedly in time.

BRIEF DESCRIPTION OF THE DRAWINGS

FIG. 12 is a determination phase difference table;

FIG. 13 is a diagram for describing an eye pattern when large jittering is detected;

FIG. 14 is a diagram for describing early and late determination points when large jittering is detected;

FIG. 15-B is a diagram for describing optimal positions of early and late determination points when small jittering is detected.

DETAILED DESCRIPTION OF THE PREFERRED EMBODIMENTS

First Embodiment

Figure 1:
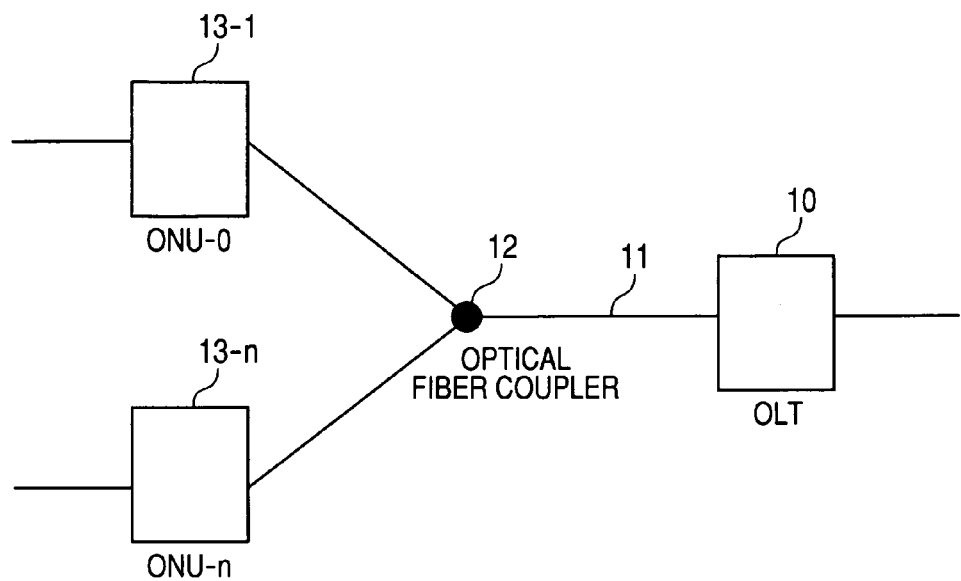
FIG. 1 is a block diagram of a general PON system.

FIG. 1 is a block diagram of a PON system to which the clock data recovery circuit of the present invention is applied as an example. The PON system consists of an OLT (Optical Line Terminal) 10 installed at a local branch of a communication provider; plural user's units ONU (Optical Network Unit) 13-$n$ installed at user sites, an optical fiber 11 used for the connection between the OLT 10 and each ONU 13-$n$, and a optical fiber coupler 12 that brunches the optical fiber 11 to each user unit ONU 13-$n$.

Downstream data signals are sent from the OLT 10 to all the ONUs 13-$n$ as the same frame. Upon receiving such a data frame, each ONU 13-$n$ determines whether the data frame is addressed to itself or to another ONU according to the address ID specific to the PON system and set in the frame header, then fetches only the data frame addressed to itself in its unit, thereby communicating with the OLT 10.

This means that downstream data signals are sent to all the ONUs as continuous data used in general packet communications in which data signals are transferred intermittently.

On the other hand, upstream data signals from each ONU 13-$n$ are sent to the OLT 10 as series of burst signals because of the characteristics of the PON system network configuration.

Figure 2:
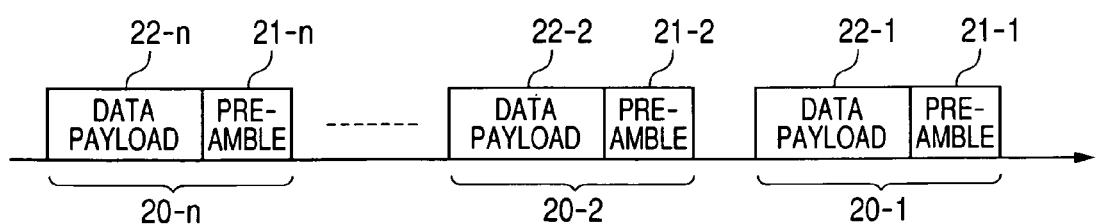
FIG. 2 is a block diagram of an upstream burst data output from an ONU.

FIG. 2 is a concept diagram of upstream data sending in a PON system. Each ONU 13-$n$ sends a burst data signal 20-$n$ in a time slot specified by the OLT 10. The burst data signal 20-$n$ consists of a preamble 21-$n$ used by the OLT 10 to detect the head of the burst data signal for clock reproduction and a payload 22-$n$ used to store user's communication data. The preamble 21-$n$ should preferably be composed of "0" and "1" alternated data so as to make it easier for the OLT 10 to reproduce the clock from the burst data.

Because upstream data signals are sent from each ONU 13-$n$ to the OLT 10 as burst data signals 20-$n$ as described above, the OLT 10 is required to reproduce a clock of which phase matches with that of the object data signal in the preamble region 21-$n$ each time the OLT 10 receives a burst data signal 20-$n$ from an ONU 13-$n$.

Here, a time required to reproduce a clock of which phase matches with that of an object burst data signal is referred to as a bit synchronization time.

The clock data recovery circuit that requires a long bit synchronization time needs a long preamble area. And such a long preamble area comes to lower the data transfer efficiency in the PON system that sends burst data signals to each ONU. This is why a clock data recovery circuit capable of realizing quick bit synchronization is required for improving the data transfer efficiency in such PON systems.

Figure 3:
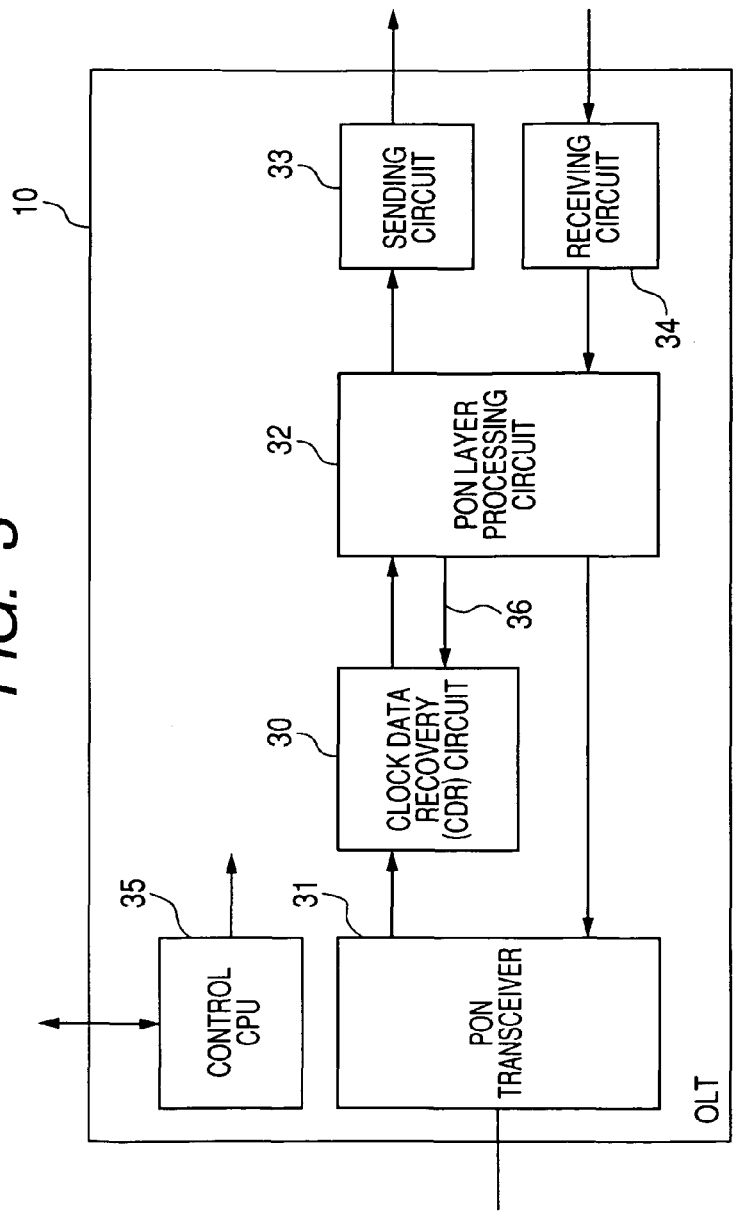
FIG. 3 is a block diagram of an OLT provided with a clock data recovery circuit of the present invention.

FIG. 3 is a block diagram of an example of the OLT 10 that employs the clock data recovery circuit of the present invention.

The OLT 10 consists of a PON transceiver 31 that sends/receives optical signals to/from each ONU 13-$n$ (E/O conversion and O/E conversion); a clock data recovery circuit 30 that notifies reproduction clocks together with burst data signals to a PON layer processing block; a PON layer processing circuit 32 that analyzes upstream burst data signals and generates downstream data frames and upstream burst data sending timings with respect to each ONU; a sending circuit 33 that transfers data to an upper network of the OLT; a receiving circuit 34 that receives data from the upper network of the OLT; and a control CPU 35 that sets each of the blocks and communicates with external control terminals (not shown).

Hereunder, there will be described how data flows in the OLT 10.

The PON transceiver 31, upon receiving a burst data signal from an ONU 13-$n$, carries out O/E conversion and sends the result to the clock data recovery circuit 30.

The clock data recovery circuit 30 establishes bit synchronization with each received burst data signal and notifies the PON layer processing block of the reproduction clock together with the burst data signal. The details of the clock data recovery circuit 30 will be described later.

The PON processing layer circuit 32 extracts a user frame from the bit pattern of each received burst data signal and transfers the extracted user frame to the sending circuit 33.

The sending circuit 33 sends user frames to the upper network system (not shown) of the OLT 10.

The receiving circuit 34, upon receiving a user frame from the upper network system (not shown) of the OLT 10, transfers the received user frame to the PON layer processing circuit 32.

The PON layer processing circuit 32, upon receiving the user frame, generates an address ID used in the PON system from the address information set in the header of the user frame, then encapsulates the user frame in a packet used in the PON system and transfers the packet to the PON transceiver 31.

The PON transceiver 31 then carries out E/O conversion for the received packet and transfers the data to the object.

Furthermore, the PON layer processing circuit 32 calculates the upstream burst data signal sending timing of each ONU 13-$n$ and notifies the result to each ONU as control data. Consequently, the PON layer processing circuit 32 always knows the time on which the subject upstream burst data signal is received and the source ONU that sends the burst data signal. The PON layer processing circuit 32 notifies the clock data recovery circuit 30 of the control signal (a burst data signal receiving trigger and a burst data signal sending ONU ID) 36 at each upstream burst data signal receiving timing.

This completes the description of how data flows in the OLT 10.

Next, there will be described the clock data recovery circuit 30 of the present invention with reference to FIGS. 4 through 8.

Figure 4:
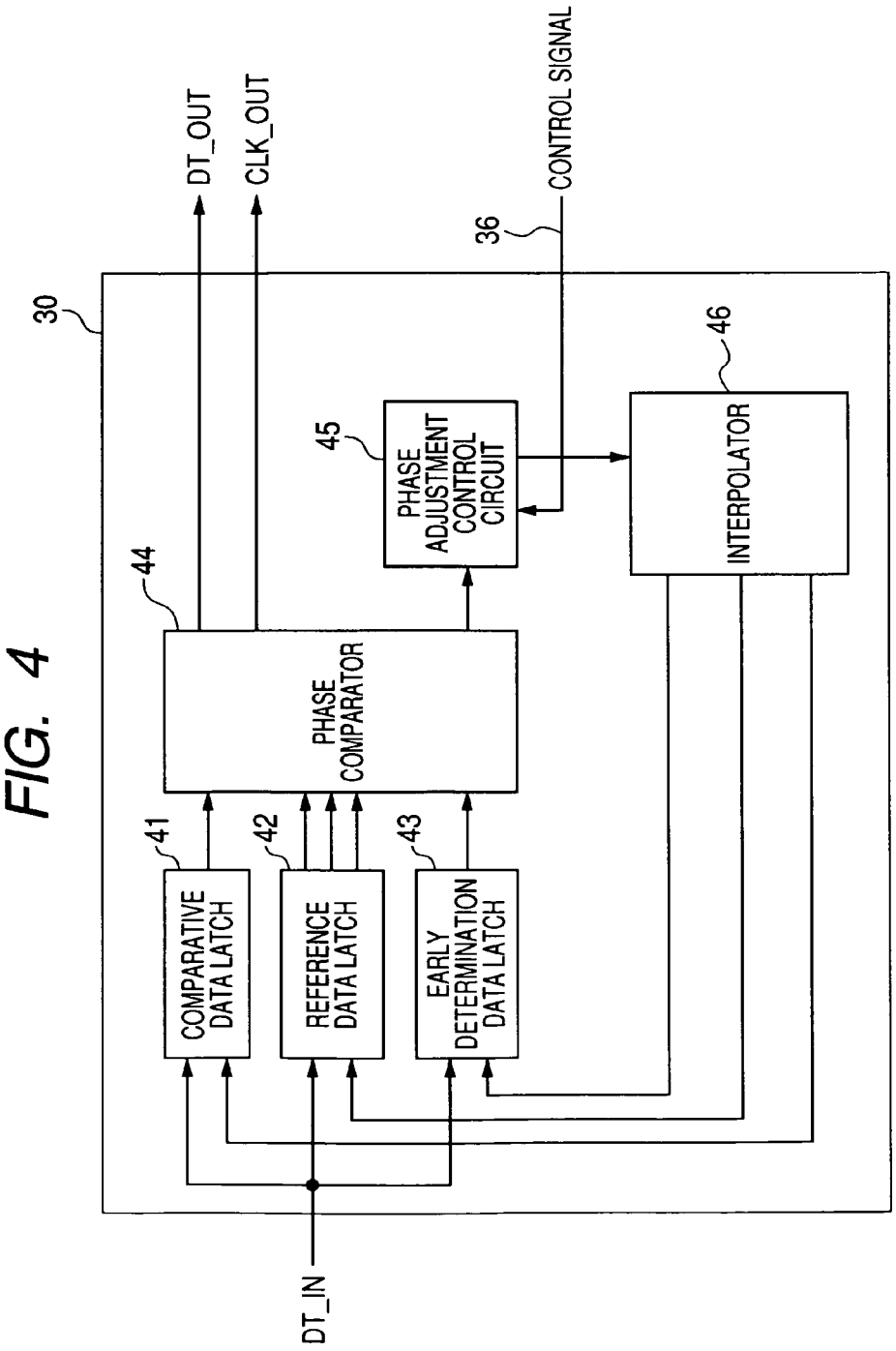
FIG. 4 is a block diagram of a clock data recovery circuit in a first embodiment.

FIG. 4 is a block diagram of a configuration of the clock data recovery circuit 30 of the present invention.

The clock data recovery circuit 30 inputs DT_IN from the PON transceiver 31 and outputs DT_OUT, reproduces CLK_OUT, and inputs control signals 36 from the PON layer processing circuit 32.

The clock data recovery circuit 30 consists of a comparative data latch 41, a reference data latch 42, an early determination data latch 43, a phase comparator 44, a phase adjustment control circuit 45, and an interpolator 46.

The comparative data latch 41, the reference data latch 42, and the early determination data latch 43 are blocks for sampling the DT_IN using clocks of three different phases generated by the interpolator 46.

The reference phase clock is the center of the three different phases described above. A clock that is early by a $\phi_{-1}$ phase from the reference phase is defined as an early clock and a clock that is late by a $\phi_{+1}$ phase from the reference phase is defined as a late clock.

It is preferable that the absolute value between $\phi_{+1}$ and $\phi_{-1}$ phases is smaller than 180 degrees.

The comparative data latch 41 samples the DT_IN using the late clock and notifies the phase comparator 44 of the sampling result.

The reference data latch 42 samples the DT_IN using the reference clock and notifies the phase comparator 44 of the sampling result. Furthermore, the reference data latch 42 notifies the phase comparator 44 of the reference phase clock and the DT_IN that are running in parallel.

The early determination data latch 43 samples the DT_IN using the early clock and notifies the phase comparator 44 of the sampling result.

Figure 5:
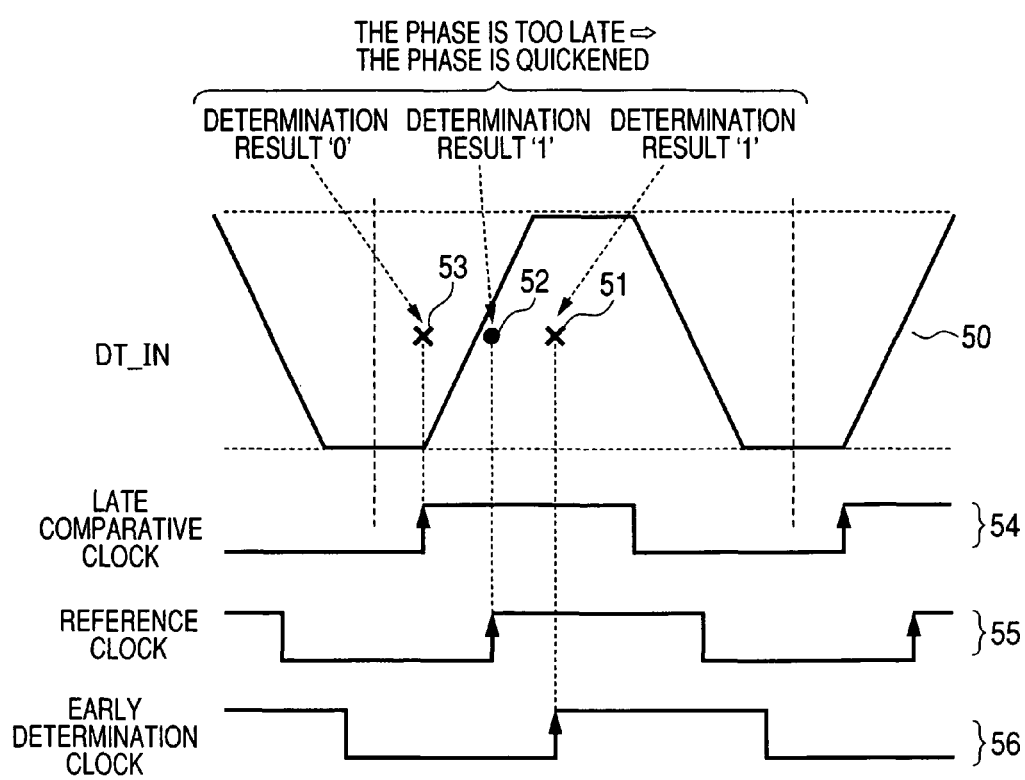
FIG. 5 is a concept diagram of phase comparison in the clock data recovery circuit.

Next, there will be described how the DT_IN is sampled by each of the comparative data latch 41, the reference data latch 42, and the early determination data latch 43 with reference to FIG. 5. FIG. 5 shows examples of the waveform 50 of the preamble 21-$n$ of a burst data signal sent from an ONU 13-$n$ to the OLT 10, as well as the clock waveforms of the comparative data latch 41, the reference data latch 42, and the early determination data latch 43. In FIG. 5, the DT_IN 50 represents a convex portion as "1" and a concave portion as "0". In FIG. 5, therefore, is shown inputted data "0"->"1"->"0".

The comparative data latch 41 inputs late clocks 54, the reference data latch 42 inputs reference clocks 55, and the early determination data latch 43 inputs early clocks. As shown in FIG. 5, the phase is varied among those late, reference, and early clocks. Each data latch samples object data at its clock rising.

In the example shown in FIG. 5, the sampling result 53 of the comparative data latch 41 is "0", the sampling result 52 of the reference data latch 42 is "1", and the sampling result 51 of the early determination data latch 43 is "1".

The phase comparator 44 obtains sampling results from the comparative data latch 41, the reference data latch 42, and the early determination data latch 43. Upon obtaining those sampling results, the phase comparator 44 figures out the exclusive logical sum (EOR) between the sampling results of the reference data latch 42 and the comparative data latch 41 and the EXOR between the sampling results of the reference data latch 42 and the early determination data latch 43. Each result EXOR is notified to the phase adjustment control circuit 45 as late and early determination results.

The EXOR calculation is required to check the matching of the sampling results among the reference data latch 42, the comparative data latch 41, and the early determination data latch 43. If those results do not match among the sampling results, it denotes that there is a change between the reference clock and another late/early clock. The phase adjustment control circuit 45, if detecting such unmatching between the sampling results of the reference data latch 42 and another data latch (e.g., the comparative data latch), quicken the late clock phase to synchronize the DT_IN 50 with the reference clock. For example, in FIG. 5, unmatching is detected between the sampling results of the comparative data latch and the reference data latch. This denotes that the reference clock is later than the DT_IN 50. If all the three sampling results are the same, the reference clock has risen almost in the center of the phase of the DT_IN. Thus the DT_IN 50 comes to be synchronized with the reference clock in this state.

Furthermore, the phase comparator 44 obtains the reference clock and DT_IN from the reference data latch 42. The reference clock and DT_IN are then notified as are to the OLT layer processing block 32 in the subsequent stage as the CLK_OUT and DT_OUT.

Figure 6:
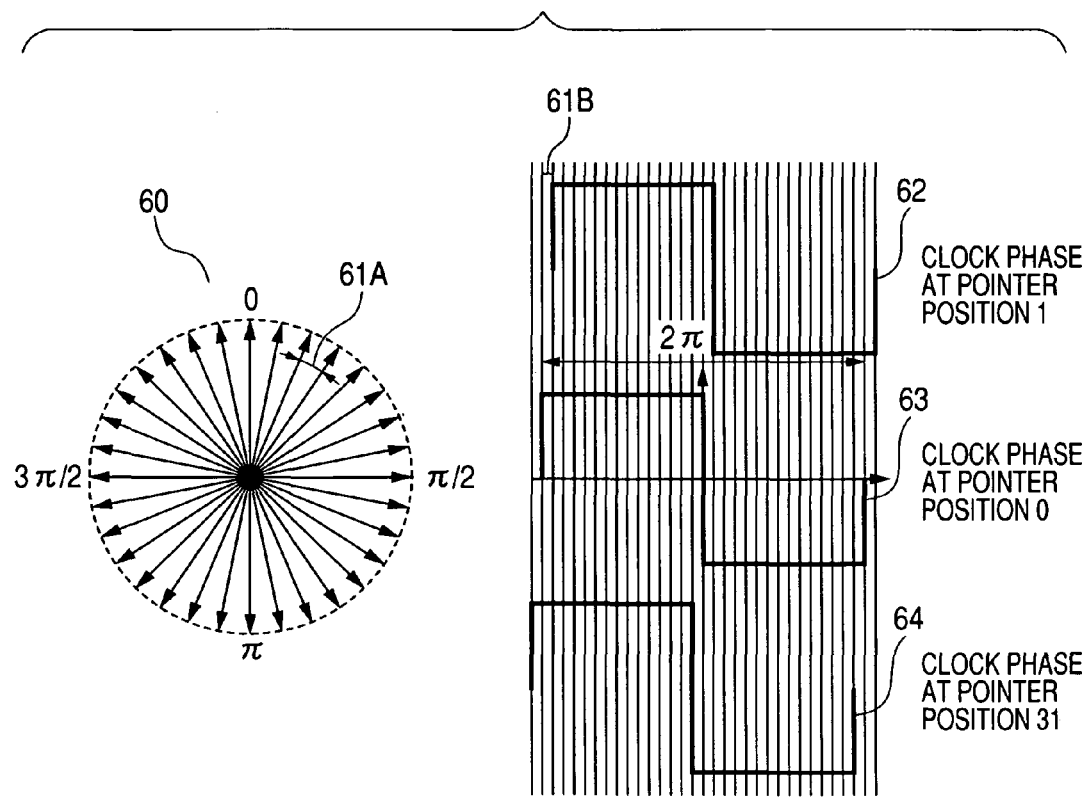
FIG. 6 is a diagram for describing a relationship between each phase and each pointer managed by an interpolator.

The interpolator 46 generates three types of clocks; reference clock, early clock, late clock. The interpolator 46 divides a 360-degree clock phase by an M value and manages the divided phases therein. FIG. 6 shows an example in which a 360-degree clock phase is divided into 32 phases and managed as divided phases 60. The interpolator 46 also manages phase intervals as pointers; the phase difference 61A between adjacent pointers becomes $\pi/16$. Consequently, if it is premised that the phase 0 clock 63 is centered and a clock of which pointer is moved by +1 can be represented as a clock 62, which is obtained by moving the phase 0 clock forward by a phase 61B of $+\pi/16$. And if it is premised that the phase 0 clock is centered and a clock of which pointer is moved by −1 can be represented as a clock 64, which is obtained by delaying the phase 0 clock 63 by a phase 61B of $-\pi/16$ from the phase 0 clock 63. This phase 0 clock is assumed as the initial position of the reference clock and the early and late clocks are kept moved from the reference clock by phases $\phi_{-1}$, $\phi_{+1}$ ($\phi_{-1}$, $\phi_{+1}$<$\pi$) respectively. The interpolator 46 can change any phase immediately to a point specified by the phase adjustment control circuit. This is why the block 46 can generate clocks synchronized with DT_IN respectively.

The phase adjustment control circuit 45 obtains the sampling result EXOR between the reference data latch 42 and the comparative data latch 41, as well as the sampling result EXOR between the reference data latch 42 and the early determination data latch 43 from the phase comparator 44 and outputs phase adjustment instructions to the interpolator 46. The phase adjustment control circuit 45 includes a late counter (not shown) and an early counter (not shown), each of which counts the number of times the above EXOR result becomes "1". The phase adjustment control circuit 45, upon obtaining a determination result with respect to a given phase determination count L from the phase comparator 44, classifies the reference clock generated by the interpolator 46 into four patterns of the DT_IN phase (early, late, matching, and inverted) according to the total value of the late counter and the early counter. And according to the classification result, the phase adjustment control circuit 45 notifies the interpolator 46 of the pointer value of the reference clock phase.

The phase difference between the DT_IN phase and the reference clock phase differs among ONU upstream burst data. Consequently, in case of the conventional method that moves the pointer by one upon detecting a phase difference, if the phase is moved by an M/2 point (M: the number of phases divided from a 360-degree clock phase)(=phase $\pi$), the pointer movement is required to be repeated by M/2 times to establish bit synchronization. On the other hand, the present invention establishes such bit synchronization just by repeating pointer movements up to N times (N=$\log_2$ M−1) as follows. (1) If the phase difference is within 0<P<M/2, the pointer movement distance is regarded as P=M/$2^{2+t}$ (t: phase comparison count after burst data receiving (t=0, 1, 2, . . . )) upon starting burst data receiving). (2) If the phase difference is 0 (matching), the pointer movement distance is regarded as 0 upon starting burst data receiving. (3) If the phase difference is M/2 (inverted), the pointer movement distance is regarded as P=M/2 upon starting burst data receiving. Employment of this method will enable bit synchronization just by repeating point movements within N times. Hereunder, there will be described the operations of the phase adjustment control circuit 45 that enables the processings in the above (1) to (3) with reference to FIGS. 7 and 8.

Figure 7:
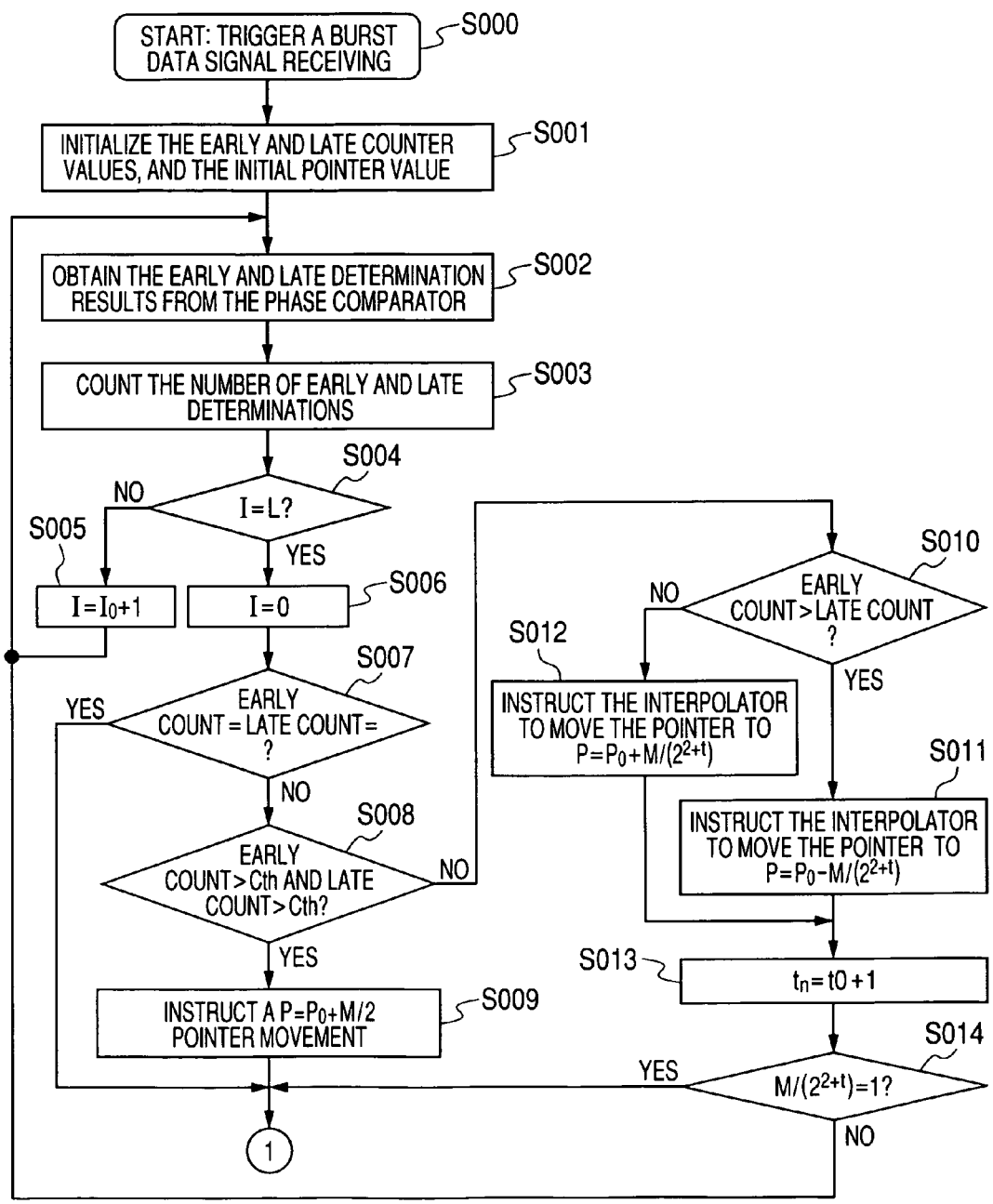
FIG. 7 is a flowchart of the processings of a phase adjustment control circuit in the first embodiment.
Figure 8:
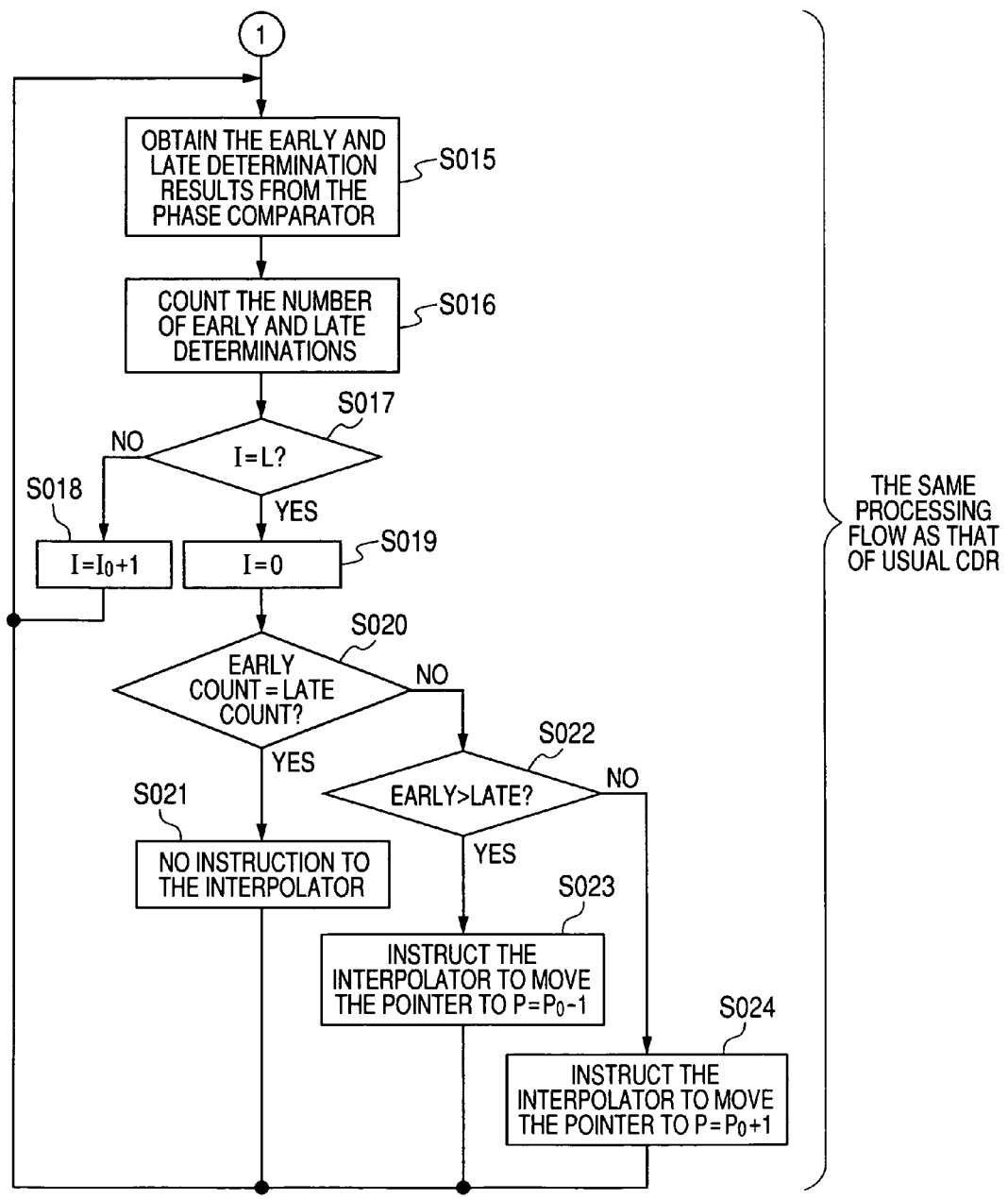
FIG. 8 is another flowchart of the processings of the phase adjustment control circuit in the first embodiment.

FIGS. 7 and 8 are flowcharts of the operation of the phase adjustment control circuit 45. FIG. 7 shows a flowchart of a quick bit synchronization processing flow carried out upon starting burst data receiving and FIG. 8 shows a flowchart of a fluctuation follow-up processing carried out after bit synchronization is established.

Upon detecting a bust data signal receiving trigger of the control signal 36 from the PON layer processing circuit 32, the phase adjustment control circuit 45 starts the subject processing (S000). The burst data signal receiving trigger is used to notify the object of an ONU upstream burst data receiving timing.

The phase adjustment control circuit 45 includes a late counter and an early counter (both not shown). At first, the phase adjustment control circuit 45 clears the values of those counter values to 0 respectively. The phase adjustment control circuit 45 then sets the pointer P to the initial phase $P_0$=0 to be notified to the interpolator 46 (S001).

The phase adjustment control circuit 45 then obtains early and late determination results from the phase comparator 44 (S002)

If the early determination result denotes "1", the phase adjustment control circuit 45 increases the value in the early counter by one. If the late determination result denotes "1", the phase adjustment control circuit 45 increases the value in the late counter by one (S003).

The phase adjustment control circuit 45 then determines whether or not the early and late determination results are obtained as many as the L count value, then determines whether or not the current obtainment count I matches with the specified count L (S004).

If the counts L and I do not match, the phase adjustment control circuit 45 adds 1 to the current value I0 and holds the result as I (S005), then repeats the processings in and after S002.

If the counts L and I match, the phase adjustment control circuit 45 clears the I value to 0 (S006), then goes to the determination of the values in the early and late counters.

The phase adjustment control circuit 45 then determines whether or not the values in the early and late counters are "0" (S007). If the counter values are "0", the reference clock is synchronized with the DT_IN. Thus the phase adjustment control circuit 45 goes to the fluctuation follow-up processing flow shown in FIG. 8 without notifying the pointer movement to the interpolator 46. The processings between S007 and S013 are referred to as a bit synchronization processing flow.

If the values in the early and late counters are not "0", the phase adjustment control circuit 45 determines whether or not the early and late counter values are over a predetermined threshold value Cth (S008). The early and late counter values are increased respectively only when the phase difference between the DT_IN and the reference clock is M/2. This means that the reference clock rising position matches with a point where the waveform "0" of the DT_IN 50 shown in FIG. 5 is changed to "1". In this case, the reference data latch sampling result is fluctuated between "0" and "1" under the influence of the jitter components included in the reference clock and the DT_IN signal. Consequently, "1" comes to appear in both of the early and late counter values. If both of the early and late counter values are over the preset threshold value Cth, it means that the phase is moved by M/2.

If both of the early and late counter values are over the threshold value Cth in S008, it means that there is a phase difference of M/2 as described above. The phase adjustment control circuit 45 thus instructs the interpolator 46 to move the pointer P to $P_0$+M/2 (S009). The processing in S009 makes it possible to synchronize the phases of the burst data signal and the reference clock with each other at one adjustment timing. After this, the phase adjustment control circuit 45 goes to the fluctuation follow-up processing flow shown in FIG. 8.

If both of the early and late counter values do not exceed the threshold value Cth in S008, the phase adjustment control circuit 45 compares the early counter value with the late counter value (S010). If the early counter value is larger than the late counter value, this means that the reference clock phase is earlier than the burst data signal phase. Thus the phase adjustment control circuit 45 instructs the interpolator to move the pointer in the minus direction (S011). At this time, the clock data recovery circuit of the present invention sets a larger pointer movement distance for the first determination of bit synchronization to realize quick bit synchronization. Furthermore, if the phase does not match between the DT_IN and the reference clock even in the second determination of bit synchronization, the pointer movement distance is under the first pointer movement distance. In such a way, the phase adjustment control circuit 45 sets a long pointer movement distance before bit synchronization is established, then decreases the movement distance gradually. Therefore, when compared with the conventional method that moves the pointer point by point, the method of the present invention can expect that DT_IN will realize quick bit synchronization. The pointer movement distance at this time should preferably be $P=P_0+M/(2^{2+t})$ (t: bit synchronization determination count $(0, 1, \ldots, \log_2(M/P)-2)$). By varying the pointer position P moving distance among bit synchronization determination counts as described above, the present invention can realize quick bit synchronization more effectively just by repeating the pointer movement within N times ($N=\log_2 M-1$) regardless of the initial phase difference.

If the late counter value is larger than the early counter value, the reference clock phase is later than the DT_IN phase. The phase adjustment control circuit 45 thus instructs the interpolator to move the pointer in the plus direction (S012). The pointer moving distance becomes $P=P_0-M/(2^{2+t})$.

Ending the processing in S011 or S012, the phase adjustment control circuit 45 adds 1 to the bit synchronization determination count value t to update the value t (S013).

Then, the phase adjustment control circuit 45 determines whether "1" is set for the $M/(2^{2+t})$ found in S011 or S012 (S014). If "1" is set for the $M/(2^{2+t})$, the bit synchronization is established. The phase adjustment control circuit 45 thus goes to the fluctuation follow-up processing flow shown in FIG. 8. If "1" is not set for the $M/(2^{2+t})$, the bit synchronization is not established yet. The phase adjustment control circuit 45 thus repeats the processings in and after S002.

This completes the description for the processing flow to realize quick bit synchronization. As described above, the clock data recovery circuit of the present invention can establish such quick bit synchronization just by repeating pointer movement N times ($N=\log_2 M-1$) in maximum through the processings shown in FIG. 7 regardless of the DT_IN phase difference.

Next, there will be described a processing flow to be carried out after bit synchronization is established with reference to FIG. 8.

The processings in S015 to S020 are the same as those in S002 to S007.

If the count value is the same between early and late counters in S020, bit synchronization is already established. The phase adjustment control circuit 45 thus instructs the interpolator to keep the same pointer position as the preceding one and repeats the processings in and after S015 (S021).

If the counter value is not the same between early and late counters in S020, the center phase of the DT_IN might be moved under the influence of jittering or the like. The phase adjustment control circuit 45 thus compares the early counter value with the late counter value similarly to the processing in S010 (S021).

If the early counter value is larger than the late counter value, the reference clock phase is earlier than the DT_IN phase. The phase adjustment control circuit 45 thus instructs the interpolator to move the pointer to $P=P_0-1$. In the fluctuation follow-up flow processings carried out after bit synchronization is established, it is expected that the phase deviation is smaller than that of the initial stage of the DT_IN receiving. Thus "1" is kept set as the minimum pointer moving distance (S023). Ending the pointer movement instruction, the phase adjustment control circuit 45 repeats the processings in and after S015.

If the late counter value is larger than the early counter value, the reference clock phase is later than that of the DT_IN. The phase adjustment control circuit 45 thus instructs the interpolator to move the pointer to $P=P_0+1$. In the fluctuation follow-up flow processing carried out after bit synchronization is established, it is expected that the phase deviation is smaller than that in the initial stage of DT_IN receiving. Thus "1" is kept set as the minimum pointer moving distance (S024). After ending the pointer movement instruction, the phase adjustment control circuit 45 repeats the processings in and after S015.

The fluctuation follow-up flow processings shown in FIG. 8 are repeated until the control signal 36 is detected. The signal 36 notifies another new burst data receiving.

Although a phase is divided by the n-power of 2 in the above embodiment, the divisor may be replaced with another; even in that case, if the pointer is much moved first, then moved less gradually, bit synchronization can be established more quickly than the conventional method that moves the pointer point by point.

Even when a phase is divided by a given M value, if the pointer is moved by a value obtained by rounding up the decimal places of a value found by $(M/2^{2+t})$, bit synchronization can be established just by the count obtained by rounding up the decimal places of $\log_2 M-1$.

For example, if a phase is divided by 27 for management, "$M/2^{2+t}=7$" is satisfied. Thus the phase adjustment control circuit 45 changes the pointer moving distance value like 7->4->2->1, thereby establishing the bit synchronization within four times obtained by rounding up the decimal places of $\log_2 M-1$.

Second Embodiment

Figure 9:
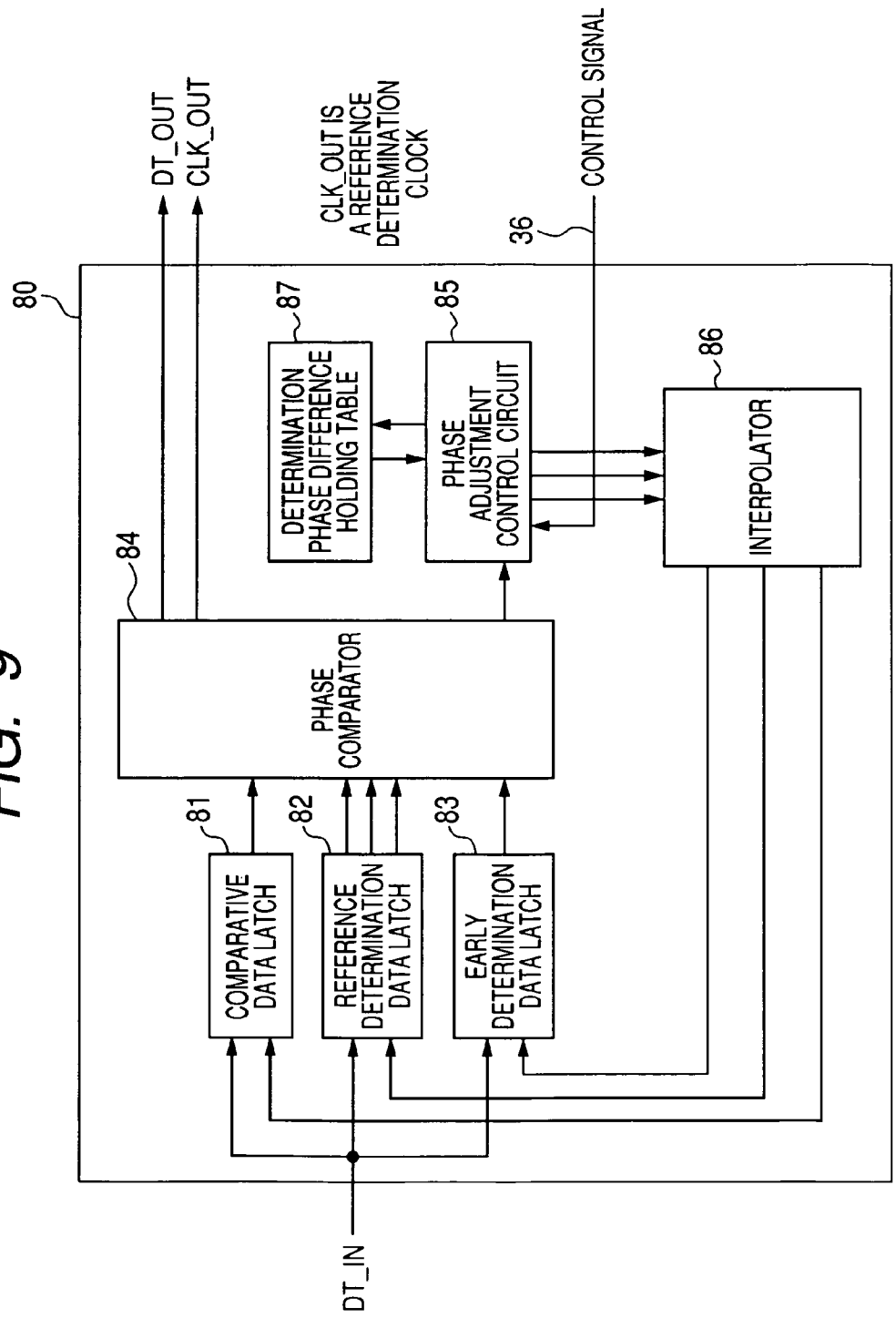
FIG. 9 is a block diagram of a clock data recovery circuit in a second embodiment.

FIG. 9 is a block diagram of a clock data recovery circuit in this second embodiment. This clock data recovery circuit 80 is to be employed for an OLT 10 in a PON system just like in the first embodiment. The structure of the OLT in this second embodiment is completely the same as that in the first embodiment except for the clock data recovery circuit. Thus descriptions for the structure will be omitted here.

The burst data signal 20-*n* output from the ONU 13-*n* comes to include various noise components added under various conditions such as the ambient temperature of the ONU 13-*n* installed place, the distance between the OLT 10 and the subject ONU 13-*n*, the number of optical fiber couplers 12 provided between the OLT 10 and the ONU 13-*n*, the temperature of the optical fiber 11 between the OLT 10 and the ONU 13-*n*, etc. As a result, jittering occurs in the signal 20-*n*.

Figure 16:
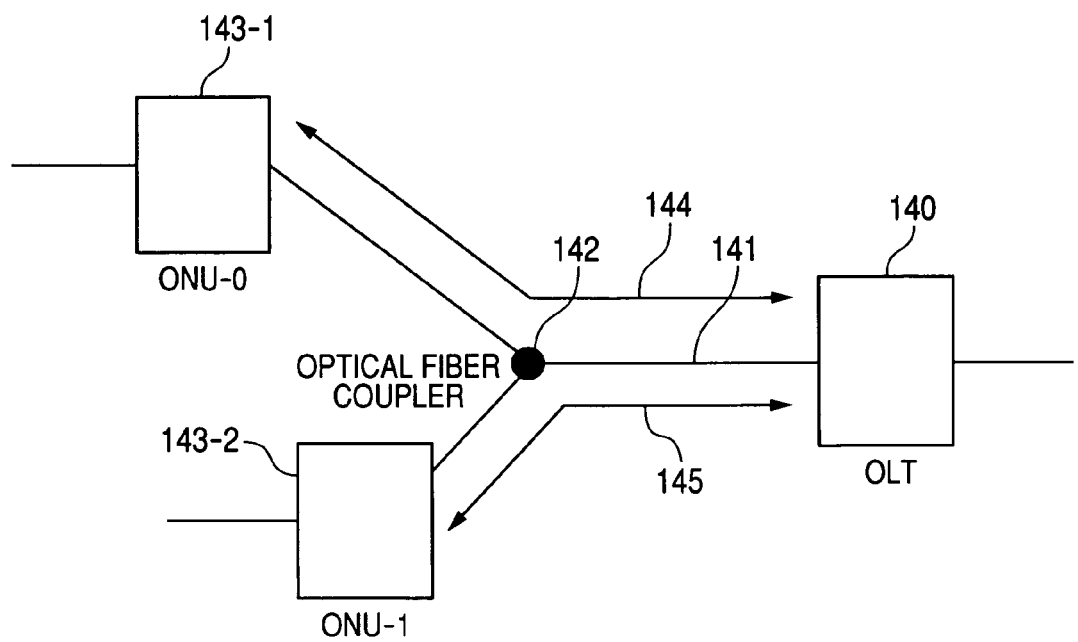
FIG. 16 is a diagram for describing a difference of a distance between OLT and ONU.

FIG. 16 is a block diagram of a PON system that varies the difference of the distance between OLT and ONU among ONUs. The OLT 140 and the ONU 143-*n* are connected to each other through a optical fiber coupler 142 and an optical fiber 141. The difference of the distance between the OLT 140 and the ONU-0 143-1 is longer than the difference of the distance between the OLT 140 and the ONU-1 143-2. In this case, generally, the jittering in the burst data signal output from the ONU-0 143-1 is larger than that of the burst data signal output from the ONU-1 143-2 (this means that the eye is small).

FIG. 13 shows a waveform of the jittering-occurred burst data signal 20-*n*. FIG. 13 also shows an eye pattern 110 to be seen when the burst data signal received by the OLT 140 is overlapped on the signal 20-*n*. A space enclosed by the rising and falling edges of the waveform of the eye pattern 110 is referred to as an eye. The clock data recovery circuit can reproduce stable clocks respectively by making data sampling in the center of such an eye.

The jittering size differs among ONUs that output the burst data signals 20-n respectively. Consequently, if the phase difference $\phi_{-1}$ between the reference clock and the early determination clock and the phase difference $\phi_{+1}$ between the reference clock and the comparative clock are fixed for use, the sampling point 112 of the early determination clock and the sampling point 113 of the comparative clock might be positioned outside the subject eye respectively as shown in FIG. 13.

In the example shown in FIG. 13, although the sampling of the reference clock is made in the center of the subject eye, the sampling result might differ between the reference data latch 82 and the early determination data latch 83 and the sampling result might differ between the reference data latch 82 and the comparative data latch 81. In this case, although the DT_IN and the reference clock are synchronized with each other in an ideal phase, their phases might be misjudged to be deviated. As a result, the pointer position of the reference clock phase might be changed. This phenomenon causes unstable clocks to be reproduced and at worst, the bit synchronization to be lost.

Hereunder, there will be described in detail a clock data recovery circuit 80 that can solve the above problems.

The clock data recovery circuit 80 inputs the DT_IN signal from the PON transceiver 31, outputs the DT_OUT signal, reproduces the CLK_OUT signal, and inputs control signals 36 from the PON layer processing block 32.

The clock data recovery circuit 80 consists of a comparative data latch 81, a reference data latch 82, an early determination data latch 83, a phase comparator 84, a phase adjustment control circuit 85, an interpolator 86, and a determination phase difference holding table 87.

The operations of the comparative data latch 81, the reference data latch 82, the early determination data latch 83, and the phase comparator 84 are the same as those of the comparative data latch 41, the reference data latch 42, the early determination data latch 43, and the phase comparator 44, so the description for them will be omitted here.

The interpolator 86 generates three types of clocks (reference clock, early clock, and late clock) having different phases respectively. The interpolator 86 divides a 360-degree clock phase by an M value and manages those divided phases therein. In FIG. 6, the 360-degree clock phase is divided by 32 and managed as divided phases 60. The interpolator 86 manages phase intervals as pointers and the phase difference 61A between adjacent pointers becomes $\pi/16$. Consequently, the clock 63 having the phase 0 is centered and a clock of which pointer is increased by one is represented as a clock 62 having a phase 61B moved forward by $+\pi/16$ from the clock 63 of the phase 0. And when the clock of the phase 0 is centered, a clock of which pointer is moved backward by one can be represented as a clock 64 having a phase 61B that is later than the clock 63 of the phase 0 by $-\pi/16$. The clock 63 of the phase 0 takes the initial position of the reference clock. And the early and late clocks are regarded to have phases deviated from the reference clock by the $\phi_{-1}$ and $\phi_{+1}$, respectively. The $\phi_{-1}$ and $\phi_{+1}$ are notified to the interpolator 86 from the phase adjustment block upon each burst signal receiving. The interpolator 86 can change a given phase immediately to any point in response to the instruction from the phase adjustment control circuit 85, thereby generating a clock synchronously with each received data.

The phase adjustment control circuit 85 has a determined phase difference holding table 87 and makes a search in the table 87 according to a search key that is a burst data signal sending ONU ID set in each control signal 36. The phase adjustment control circuit 85 then notifies the search result to the interpolator 86. Other functions of the phase adjustment control circuit 85 are the same as those of the phase adjustment control circuit 45 in the first embodiment.

FIG. 12 shows a table format of the determined phase difference holding table 87 held in the phase adjustment control circuit 85. The table 87 holds both of the early determination phase 102 $\phi_{-1}$ and the late determination phase 103 $\phi_{+1}$ corresponding to each ONU ID 101. The search key of this table 87 is each ONU ID.

The early and late determination phases for each ONU can be determined by the fluctuation of the ONU bit pattern collected in a ranging processing (measurement of the distance between ONU and OLT) carried out each time an ONU is added to the subject PON system or the distance between ONU and OLT. In case of an ONU having a long distance, large early and late determination phases 102 and 103 are set. In case of an ONU having a short distance, small early and late determination phases 102 and 103 are set.

Figure 10:
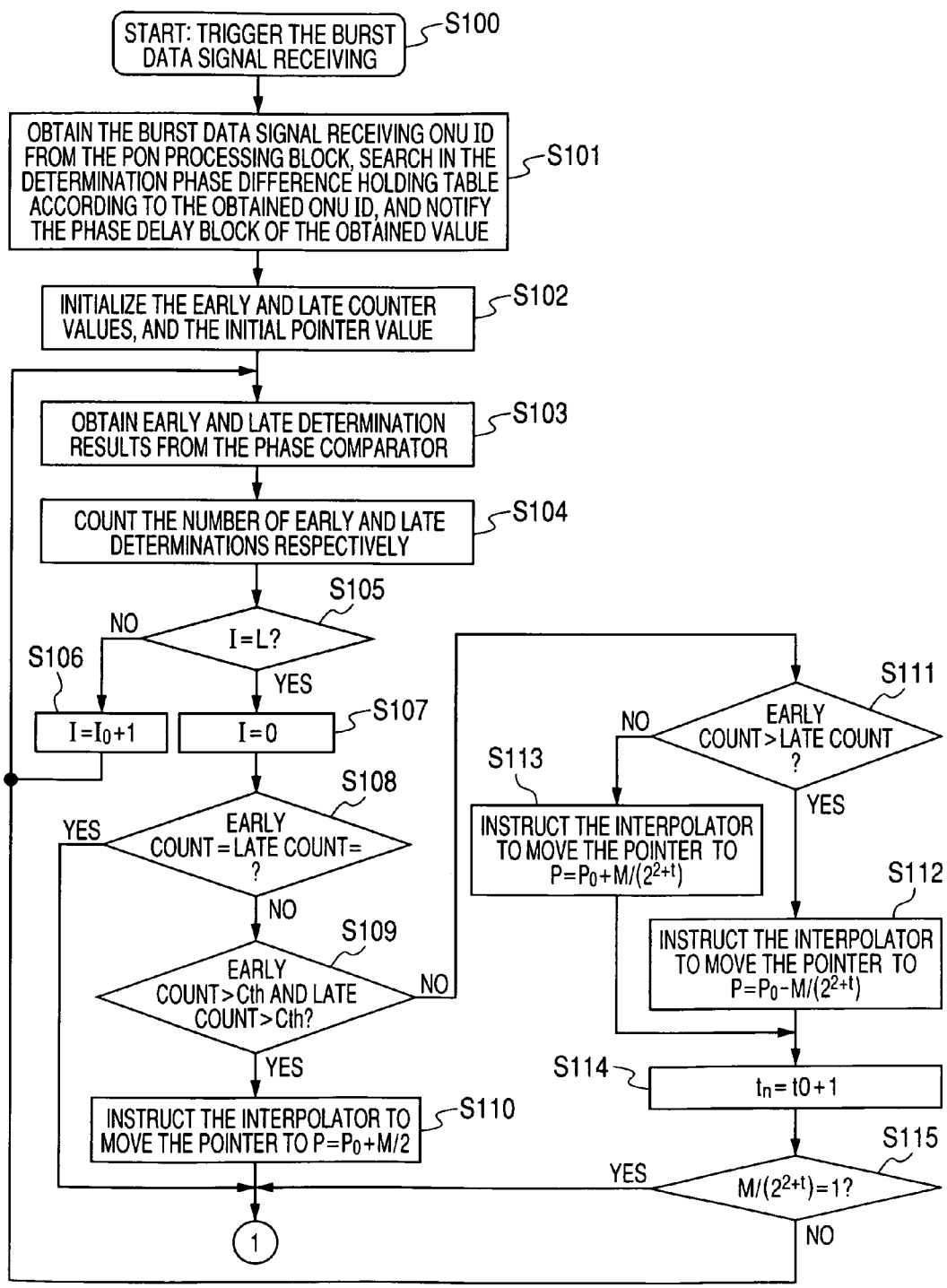
FIG. 10 is a flowchart of the processings of a phase adjustment control circuit in the second embodiment.
Figure 11:
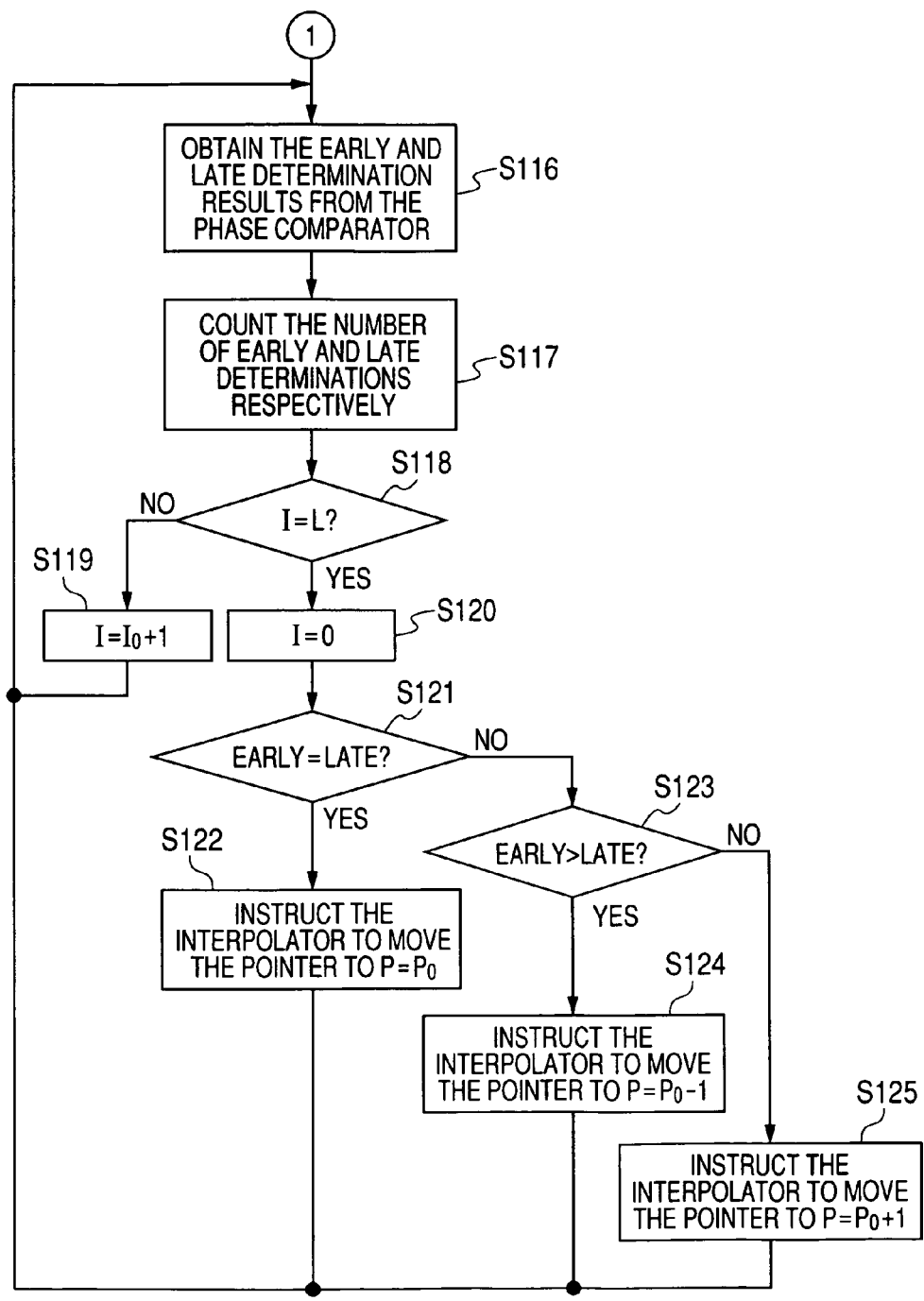
FIG. 11 is another flowchart of the processings of the phase adjustment control circuit in the second embodiment.

Hereunder, there will be described the processings of the phase adjustment control circuit 85 with reference to FIGS. 10 and 11.

The phase adjustment control circuit 85, upon detecting a burst data signal receiving trigger set in a control signal 36 output from the layer processing block 32, begins the corresponding processing (S100). The trigger is used to notify an ONU upstream burst receiving timing.

At first, the phase adjustment control circuit 85 searches in the determination phase difference holding table 87 according to the burst data signal sending ONU ID set in the control signal 36 to obtain the early and late determination phases 102 and 103 matching with the ONU ID. The obtained early and late determination phases 102 and 103 are notified to the interpolator 86 together with the reference clock initial pointer phase "0" (S101).

The processings in S102 to S125 are the same as those in S001 to S024 in the first embodiment respectively, so the description of those processings will be omitted here.

The table 87 holds the phase difference between the reference clock and the early determination clock, as well as the phase difference between the reference clock and the comparative clock for each ONU ID. As shown in the example in FIG. 14, if there is large jittering, a large phase difference is set between the reference clock and the early determination clock and between the reference clock and the early determination clock respectively, thereby the reference clock can be set in the center of the object eye.

Figure 15A:
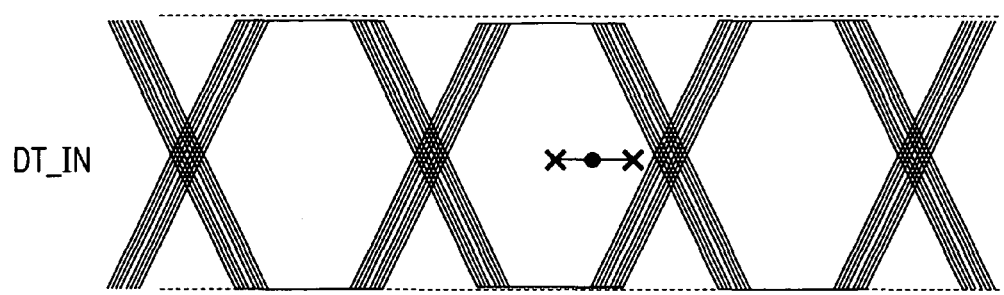
FIG. 15-A is a diagram for describing improper positions of early and late determination points when small jittering is detected.
Figure 15B:
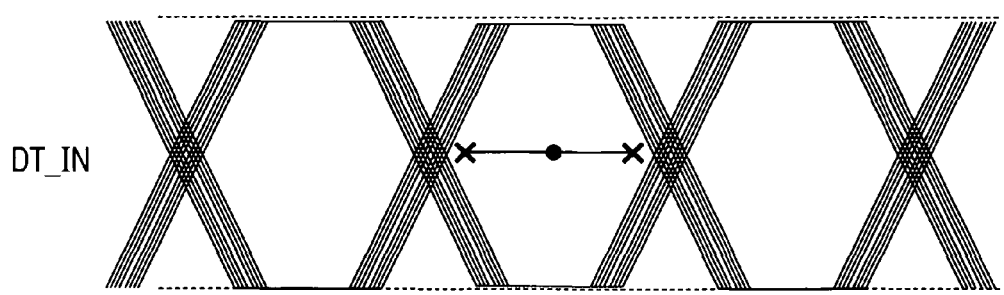

On the other hand, as shown in the example in FIG. 15-a, if there is small jittering, it should be avoided to set a small phase difference between the reference clock and the early determination clock and between the reference clock and the early determination clock respectively. Otherwise, bit synchronization comes to be established at an edge of the object eye.

If bit synchronization is not established in the center of the subject eye, it denotes occurrence of jittering, thereby the reference clock might go off the eye. If the reference clock goes off the eye in such a way, a bit error is generated, thereby obtained data cannot be read correctly. This has been a problem.

In case of a PON system in which a jittering value differs among ONUs in such a way, the system is required to change the phase difference between the reference clock and the early determination clock and that between the reference clock and the comparative clock so as to keep the bit synchronization established in the center of DT_IN.

If the jittering value is small as shown in the example in FIG. 15-b, therefore, a large phase difference is set between the reference clock and the early determination clock and between the reference clock and the comparative clock respectively. As a result, bit synchronization is established in the center of the object eye. This is why the clock data recovery circuit of the present invention is more effective to prevent bit synchronization from being lost even when jittering occurs than the convention one.

Furthermore, there is no need to keep the same absolute value set for the early and late determination phases in the determination phase difference holding table shown in FIG. 12. For example, if a small value is set for the late determination phase and a large value is set for the early determination phase, the optimal effect can be expected for the synchronization with signals having an irregular eye pattern of which front portion is deformed respectively.

What is claimed is:

1. A clock data recovery circuit, comprising:
a data sampling block that samples a burst data signal with a reference clock having the same frequency as that of the burst data signal;
a reference clock generation block that generates the reference clock at a fixed phase difference;
a phase comparator that determines a phase difference between the burst data signal and the reference clock according to a result of sampling by the data sampling block; and
a phase adjustment control circuit that collects the result of the comparison from the phase comparator and notifies the reference clock generation block of how much the reference clock phase is moved in each fixed phase determination period,
wherein the phase adjustment control circuit, upon detecting a phase difference between a burst data signal and a first reference clock in the first phase determination period after beginning receiving of burst data signals, instructs the reference clock generation block to generate a second reference clock of which phase is moved by a first phase moving distance that is N times of the fixed phase difference from the initial phase of the first reference clock, then instructs the reference clock generation block to generate a third reference clock of which phase is further moved by a distance under the first phase moving distance and over the fixed phase difference from the second reference clock in the next and subsequent phase determination periods, and instructs the reference clock generation block to generate a fourth reference clock of which phase is moved by the fixed phase difference from the first reference clock upon detecting a phase difference between the burst data signal and a previous reference clock after the phase moving distance matches with the fixed phase difference.

2. The clock data recovery circuit according to claim 1,
wherein the N means an integer obtained by rounding up the decimal places of a value found with $(M/2^{2+t})$ that uses two parameters that are the M obtained by dividing a phase $\pi$ by the fixed phase difference and the comparing count t (t =0, 1, 2, . . .) started upon receiving burst data, and
wherein the phase moving distance in the second and subsequent times becomes an integer obtained by rounding up the decimal place of a value found with ½ of the N.

3. The clock data recovery circuit according to claim 1,
wherein the reference clock generation block generates three types of clocks that are the reference clock, an early sampling clock having the same frequency as that of the reference clock and an early phase, and a late sampling clock having the same frequency as that of the reference clock and a late phase.

4. The clock data recovery circuit according to claim 3,
wherein the data sampling block samples the burst data signal using the reference clock, the early sampling clock, and the late sampling clock.

5. The clock data recovery circuit according to claim 1,
wherein the phase comparator determines whether or not the burst data signal is earlier or later than the reference clock according to the result of sampling by the data sampling block and notifies the result to the phase adjustment control circuit.

6. The clock data recovery circuit according to claim 3,
wherein the phase adjustment control circuit holds sampling clock phase difference information that denotes a correspondence between a burst identifier used to identify a burst data signal and a phase difference of a sampling clock used upon receiving the burst data signal,
wherein the phase adjustment control circuit receives a burst identifier usable to identify the burst data signal before receiving the burst data signal and refers to the sampling clock phase difference information to identify the sampling clock phase difference corresponding to the burst identifier, then notifies the identified sampling clock phase difference to the reference clock generation block, and
wherein the reference clock generation block sets the phase difference between the reference clock and the early sampling clock as the identified sampling clock phase difference, then also sets the phase difference between the reference clock and the late sampling clock as the identified sampling clock phase difference.

* * * * *